(12) United States Patent
Bessler et al.

(10) Patent No.: US 8,352,310 B1
(45) Date of Patent: Jan. 8, 2013

(54) WEB-ENABLED METRICS AND AUTOMATION

(75) Inventors: James E. Bessler, Overland Park, KS (US); David Bledsoe, Leavenworth, KS (US); James T. Deel, Sprint Hill, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 3544 days.

(21) Appl. No.: 10/625,431

(22) Filed: Jul. 23, 2003

(51) Int. Cl.
*G06Q 10/00* (2012.01)

(52) U.S. Cl. .................................. 705/7.38

(58) Field of Classification Search .......... None
See application file for complete search history.

(56) References Cited

U.S. PATENT DOCUMENTS

| | | | | |
|---|---|---|---|---|
| 5,881,222 A * | 3/1999 | Berry et al. | | 714/47 |
| 6,032,184 A * | 2/2000 | Cogger et al. | | 709/223 |
| 6,370,573 B1 * | 4/2002 | Bowman-Amuah | | 709/223 |
| 6,513,129 B1 * | 1/2003 | Tentij et al. | | 714/4 |
| 6,571,285 B1 * | 5/2003 | Groath et al. | | 709/223 |
| 2001/0044840 A1 * | 11/2001 | Carleton | | 709/223 |
| 2003/0191837 A1 * | 10/2003 | Chen | | 709/224 |
| 2003/0226059 A1 * | 12/2003 | Braun | | 714/20 |
| 2004/0088405 A1 * | 5/2004 | Aggarwal | | 709/224 |
| 2004/0237077 A1 * | 11/2004 | Cole et al. | | 717/162 |
| 2004/0250261 A1 * | 12/2004 | Huibregtse | | 719/318 |

OTHER PUBLICATIONS

Fearn et al., "Designing Tivoli Solutions for End-to-End Systems and Service Management", Jun. 1999, First Edition, 349 pages.*

* cited by examiner

*Primary Examiner* — Jonathan G Sterrett

(57) ABSTRACT

A method and system for monitoring enterprise system performance in which a datastore receives and stores performance metric data from different enterprise systems and provides the performance metric data to a web-based browser interface for presentation to a user as one or more linked web pages. In a preferred embodiment, the linked web pages are accessible on an enterprise intranet.

26 Claims, 11 Drawing Sheets

FIG. 3

YTD Production Ticket Status for: Bill Branch – Monthly

All Applications 2003 (Year-to-Date)

| Application Name | Severity 1 | | | | Severity 2 | | | | Severity 3 | Severity 4 | Severity 1 Open | Severity 2 Open | Severity 3 Open | Severity 4 Open | Availability % |
|---|---|---|---|---|---|---|---|---|---|---|---|---|---|---|---|
| | Total | Missed SLA | Avg Time to Bypass | Maintenance Costs ($) | Total | Missed SLA | Avg Time to Bypass | Maintenance Costs ($) | Total | Total | | | | | |
| WF Monarch | 0 | 0 | 0 | 0 | 0 | 0 | 0 | 0 | 0 | 0 | 0 | 0 | 0 | 0 | 98.75 |
| PV Realestate | 0 | 0 | 0 | 0 | 0 | 0 | 0 | 0 | 0 | 0 | 0 | 0 | 0 | 0 | 98.50% |
| CJ Control Broker | 0 | 0 | 0 | 0 | 0 | 0 | 0 | 0 | 0 | 0 | 0 | 0 | 0 | 0 | 100% |
| MW ESCM | | | | | | | | | | | | | | | 96.95% |
| GB Security Broker | 11 | 0 | 0:05:43 | 788 | 5 | 0 | 1:49:48 | 704 | 1 | 0 | 0 | 0 | 1 | 0 | 99.57% |
| XA Mercury DCA EB | 1 | 0 | 0:03:0 | 3 | 0 | 0 | 0 | 0 | 0 | 0 | 0 | 0 | 4 | 0 | 97.53% |
| WJ Webiocic | 0 | 0 | 0 | 0 | 0 | 0 | 0 | 0 | 0 | 0 | 0 | 0 | 4 | 0 | 99.26% |
| WO Message Broker | 0 | 0 | 0 | 0 | 0 | 0 | 0 | 0 | 0 | 0 | 0 | 0 | 0 | 0 | 97.17% |
| HZ PNS | 0 | 0 | 0 | 0 | 0 | 0 | 0 | 0 | 37 | 0 | 0 | 0 | 7 | 0 | 99.85% |
| 2S N | 0 | 0 | 0 | 0 | 6 | 0 | 0:15:40 | 505 | 170 | 0 | 0 | 0 | 0 | 0 | 100% |
| V5 VCS | 0 | 0 | 0 | 0 | 0 | 0 | 0 | 0 | 0 | 0 | 0 | 0 | 0 | 0 | 99.91% |
| WF Workflow Broker | 0 | 0 | 0 | 0 | 0 | 0 | 0 | 0 | 2 | 0 | 0 | 0 | 0 | 0 | 95.75% |
| TW Trouble Manager | 0 | 0 | 0 | 0 | 0 | 0 | 0 | 0 | 5 | 0 | 0 | 0 | 0 | 0 | 100% |
| TP Control Broker | 0 | 0 | 0 | 0 | 0 | 0 | 0 | 0 | 0 | 1 | 0 | 0 | 0 | 0 | 99.94% |
| O2 Ontrack LMT | 0 | 0 | 0 | 0 | 0 | 0 | 0 | 0 | 0 | 1 | 0 | 0 | 0 | 0 | 100% |
| A4 Information Broker | 1 | 0 | 0:0:28:42 | 36 | 1 | 0 | 0:2:45:55 | 212 | 3 | 0 | 0 | 0 | 0 | 1 | 92.35% |
| JG Workflow Broker | 0 | 0 | 0 | 0 | 0 | 0 | 0 | 0 | 0 | 0 | 0 | 0 | 0 | 0 | 100% |
| NIV Control Broker | 0 | 0 | 0 | 0 | 0 | 0 | 0 | 0 | 0 | 0 | 0 | 0 | 0 | 0 | Not available |
| FM FMS Bridge | 0 | 0 | 0 | 0 | 0 | 0 | 0 | 0 | 0 | 0 | 0 | 0 | 0 | 0 | Not available |
| ENS Ent Naming Service | 0 | 0 | 0 | 0 | 0 | 0 | 0 | 0 | 0 | 0 | 0 | 0 | 0 | 0 | Not available |
| WSS Ent Security Service | 0 | 0 | 0 | 0 | 0 | 0 | 0 | 0 | 0 | 0 | 0 | 0 | 0 | 0 | Not available |
| CDPM Privacy Management | 0 | 0 | 0 | 0 | 0 | 0 | 0 | 0 | 0 | 0 | 0 | 0 | 0 | 0 | Not available |
| Year-to-Date Totals | 13 | 0 | 0:0:6:34 | 797 | 12 | 0 | 0:0:26:26 | 1421 | 218 | 2 | 0 | 0 | 16 | 2 | 98.58% |

WEB-ENABLED METRICS AND AUTOMATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

It is not uncommon for a business organization to have a multitude of computer systems and platforms for carrying out business processes (e.g., order processing, product delivery scheduling). As shown in FIG. 1, a single business process 100 may be carried out by various applications 110-140, which may involve many types of computer systems, software applications or computing platforms. For example, a network terminal 110 may serve as a first application for confirming receipt of an order. In the next step in the business process, a server may use a software package 120 to query a datastore to determine if the order can be fulfilled. In a third step, a web page 130 may serve as a third type of application for entering and tracking order specifics. Similarly, several other types of applications 140 may be required to complete the business process. Since all of the disparate applications 110-140 are expected to perform in an efficient and error-free manner, it is important to be able to gather comparable performance data for each application and report the data in a consistent manner.

Typically, data concerning the performance of each enterprise system within a business process can be directly collected from each system, or indirectly via a linked system or agent designed for reporting the data. However, each system within a business process may have a unique format for reporting the related data. Further, systems with differing platforms or architectures may provide data in formats that are not consistent with one another, requiring a translation or formatting before each set of data can be compared or presented with a set of data from a dissimilar system. In addition, there may be a discrepancy between fields of data reported for each system, such that like parameters cannot be directly compared. The data reported by each system also may be raw data, not properly translated into a usable metric, such as a percentage downtime, as opposed to a raw hourly measurement. These data reporting inconsistencies make it very difficult to compare performance between various systems.

Allocating resources between enterprise systems is an important component of running a business. Proper resource allocation includes a calculated distribution of resources to each system, including personnel, bandwidth, workload allocation, supplies and maintenance resources. It is typical that some systems will perform better than others. The tendency is to assign a higher workload to these better-performing systems. However, this imbalance in assigned workload can result in higher downtime for a burdened system, while other capable systems run well below capacity. If a system running at or near maximum capacity goes down for repair, it may take valuable time to transfer the workload to systems with extra capacity. It is therefore beneficial to maintain a balanced workload between systems, which requires accurate and consistent data reporting in order to monitor related performance data. Proper assessment of each system's performance and utilization contributes to more efficient and smoother operations, with better workload distribution and lower system downtimes.

Currently, several levels of system performance reporting may exist on various systems, ranging from no monitoring or reporting of data at all to piecemeal data reporting, with snippets of data reported for each system. As mentioned previously, different data monitoring and reporting methods may also be employed for each system, often with users manually reporting their observations of how a system is performing. Word-of-mouth from users and operators is often not impartial and accurate enough to assess the relative status of a particular system. Partialities and other subjective factors—instead of hard data—may influence which systems receive more maintenance, higher workload allocation, and extra resources. Not only can comparable data be used to adequately assess system performance, but this data may prove useful as feedback for ongoing and future system designs by funneling data collected to requirements analysis and systems architecture personnel.

System performance data generally exists within a system, and only needs to be collected and reported in a usable fashion. It is desirable to be able to package and report data in a uniform format from all systems involved in the business process without having to design and manufacture a unique data collection and reporting system for each unique system. Further, it is desirable to have the capability to monitor all systems real-time or near-real time, as well as continuously. Accordingly, an objective automated method of reporting and comparing the performances of all related systems within a business process is desirable.

BRIEF SUMMARY

A method and system are disclosed for monitoring enterprise system performance in which a datastore receives and stores performance metric data from a plurality of different enterprise systems and provides the performance metric data to a web-based browser interface for presentation to a user as one or more linked web pages.

A preferred embodiment further includes performance metric data including trouble tickets having an associated application, date, and severity level, as well as data indicative of application availability. A preferred embodiment further displays performance metric data including completed transaction counts. One or more linked web pages preferably includes an application status overview having trouble ticket counts displayed as a function of application and severity, as well as a maintenance cost associated with high-severity trouble ticket counts. Feedback is also available in a preferred embodiments by receiving survey responses from application managers and providing survey response data to the web-based browser interface for presentation to a user as a survey results web page.

BRIEF DESCRIPTION OF THE DRAWINGS

For a detailed description of exemplary embodiments of the invention, reference will now be made to the accompanying drawings in which:

FIG. 3 shows an application status overview screen of the preferred embodiments;

NOTATION AND NOMENCLATURE

Figure 1:
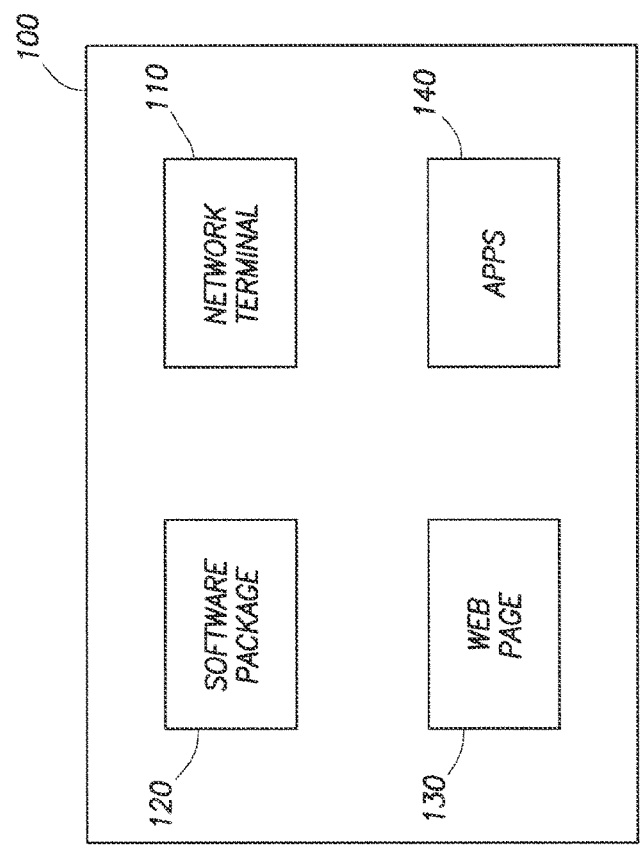
FIG. 1 shows a block diagram of various applications within a business process.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . "

The term "computer" is intended to mean a computing entity, which may be a server, terminal, personal or other computer, or a network of computing entities working together as a unit. The term "server" refers to a computing entity which is generally linked to and performing some service for one or more computing entities. The term "datastore" refers to a computing entity housing a collection of data organized for search and retrieval, such as relational databases, directory services, or in some instances even some types of defined or open format text files. The term "network" encompasses any of the various pathways computers or systems may use for communication with each other including ethernet, token-ring, wireless networks, or the internet.

The term "application" refers to an executable software package or program that can be run on a computing entity. The term "interface" refers to a mode of interaction between a user and computer, or alternately, between two computing systems or applications. The term "terminal" refers to a computing entity with which a user can actively interact having remote computing means, such as a central server.

DETAILED DESCRIPTION

The following discussion is directed to various embodiments of the present disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to suggest that the scope of the disclosure, including the claims, is limited to that embodiment.

In accordance with the present invention, a method and related system are disclosed for providing an enterprise-wide systems management strategy for managing a business environment and using real-time data for development projects and informed decision-making by information technology (IT) and business owners. An enterprise systems management (ESM) strategy in accordance with the preferred embodiments incorporates the concept of "real data, real time" to gather, collate, analyze and report critical aspects of a business-process operational environment in a web-based format. Parameters monitored by the ESM strategy may include risk management, quality of service, and cost of ownership. Implementing an ESM strategy in accordance with the preferred embodiments may contribute to increased operational efficiency and reduced operational costs.

Figure 2:
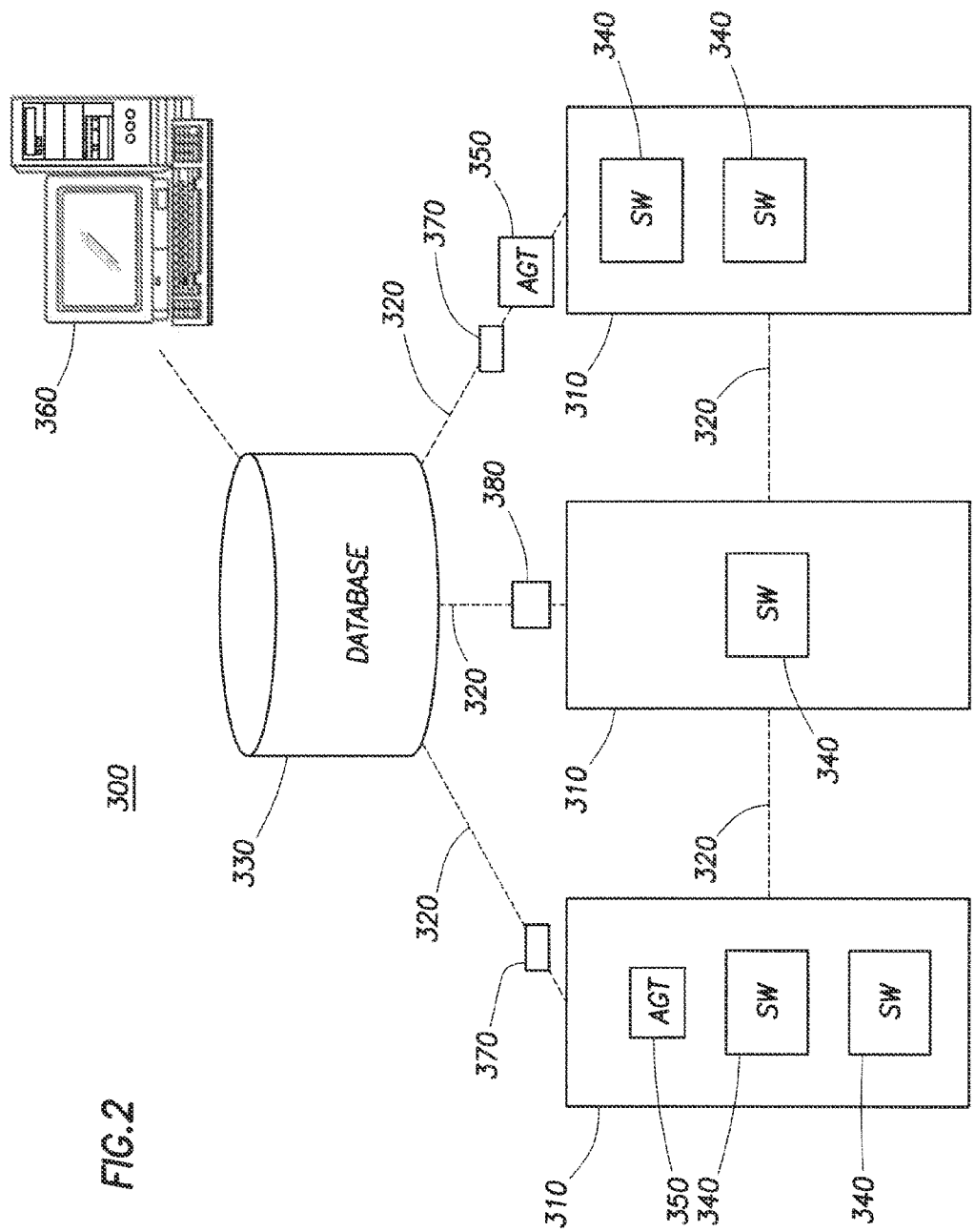
FIG. 2 shows a block diagram of an exemplary network of systems and applications configured for consistent performance data reporting.

Referring now to FIG. 2, an exemplary embodiment of enterprise systems management configuration 300 is shown. Several enterprise systems 310 are linked by a network 320 to a central datastore 330, which may run on a single computer or may be distributed across multiple datastore systems. Systems 310 generally execute a myriad of software applications 340. Each system 310 may have an internal meter, such as a software or hardware agent 350, for measuring system performance parameters. Agent 350 may be installed or stored within a system 310 or may be intermediate to a system and the datastore 330. Linked from datastore 330 are one or more user interfaces 360, which may be networked terminals, desktop PCs or other such computers for allowing a user to view and analyze data.

Agents 350 may be installed within a system 310 or in the network 320 between a system and a linked datastore 330. In addition, a gateway 370 may be present on the network 320 between a system 310 and the linked datastore 330. A gateway 370 may perform translation of data collected by the agent 350 into a form readable by the datastore 330. Additionally, a gateway 370 may remove unneeded data or process data into a format consistent with data collected from other systems 310. Alternatively, a combined agent/gateway 380 may perform the collective functions of both an agent 350 and a gateway 370. Agents 350 may either be passive or active. Passive agents 350 may collect data as it is generated. Active agents 350 may periodically query or scan systems 310 for data. Active agents 350 can also be configured such that data not readily provided by a particular system 310 is sought out and collected. Once the data is collected by the agent 350, the agent may perform some data translation, alone or in combination with a gateway 370 before sending the data to a presentation layer (e.g. a user interface 360) via the central datastore 330.

Agents 350 can further be configured such that absent or troublesome data can trigger an alarm viewable on the user interface 360. For critical systems 310, an agent 350 may provide an auto-restart function if an auto-failover capability does not already exist within a system or software application 340. Essentially, an agent 350 preferably acts as a broker to maintain the consistent flow of data from each system 310 to the datastore 330 for reporting to user interfaces 360. As each system 310 may report data in different formats or report different fields of data altogether, the agent 350 and gateway 370 ensure that the same parameters are monitored and collected for each system and translated (if required) into a consistent format usable to the datastore 330.

A wide variety of performance parameters are monitored by the agents and reported to the datastore for tabulation into a meaningful form—i.e. "real data." Datastore 330 receives or gathers data from each system 310 and provides real-time or near-real-time, consistently formatted data to a user via an interface 360. A slight delay may be acceptable to allow time for processing the raw data into a usable format. As opposed to raw data, which may consist of raw figures or unformatted numerical data, the datastore 330 endeavors to present the data collected from the various disparate systems 310 into a single, consistent format without the requirement for a unique internal metric for each system or system type.

Depending on computing power and the level of formatting to perform prior to presenting data to a user, a slight lag—such as a few seconds or even a few minutes—may be acceptable. More desired computation or formatting may take more time to prepare, and consequently, may require more lag time. Data presented closer to its raw form may be presented closer to real-time. In some embodiments, a high-level user or system administrator would have the ability to determine the level of detail to be presented, and as such, the amount of lag time to be incurred. For less critical data, a greater lag time may be acceptable, and conversely, more critical data may demand a shorter lag time.

Referring now to FIG. 3, an application status overview screen 400 in accordance with the preferred embodiments is a web-based user interface displayed by accessing a ticket metrics tab 410 on a menu bar 405. Application status overview screen 400 displays an overview of several key parameters for applications within the monitored business process(es) and performance metric data obtained by submitted trouble tickets. Option menus 420 allow a user to filter the displayed information by various parameters. In general, when unfiltered, current information for all applications within the business process is shown. Application status information can be filtered using a specific organization filter menu 422, application filter menu 424, and/or year filter menu 426. Filters 422, 424 and 426 are preferably pull-down menus, but may be text-input fields, multiple-select fields or other data selection field types commonly used on websites.

Information shown in the application status overview screen 400 is preferably displayed in tabular format, by application name 430. The status overview screen 400 permits a business manager or other user to quickly assess the status of any pertinent application 430, identify trouble spots or potentially troublesome trends and make related management decisions. Several application-status parameters 440 are sorted by severity classifications 480, allowing a user to quickly focus on the most severe and/or customer-impacting issues, if so desired. Application-specific parameter totals, preferably classified by severity level 480, are total application-specific opened tickets 442, application-specific tickets resulting in missed service level agreements (SLA) 444, average time to bypass an associated application-specific ticket 446, maintenance costs associated with addressing associated application-specific tickets 448, and currently open application-specific tickets 462. Unsorted by severity level 480 is application-specific availability 466, preferably expressed as a percent uptime for each application 430.

The same key parameters are also summed for every application 430 listed in the overview screen 400, giving a user a snapshot of the performance of all applications, classified by severity level 480. Overall application-status parameter totals, summed across all listed applications 430, are total opened tickets 452, total tickets resulting in missed service level agreements (SLA) 454, average time to bypass a ticket 456, total maintenance costs associated with addressing tickets 458, and total currently open tickets 464. Overall application availability 468 is calculated from application-specific availability 466 percentages on record. Selecting a specific application 430, such as the Monarch application 490, allows a user to drill clown to a greater level of detail, as shown in FIG. 4.

Figure 4:
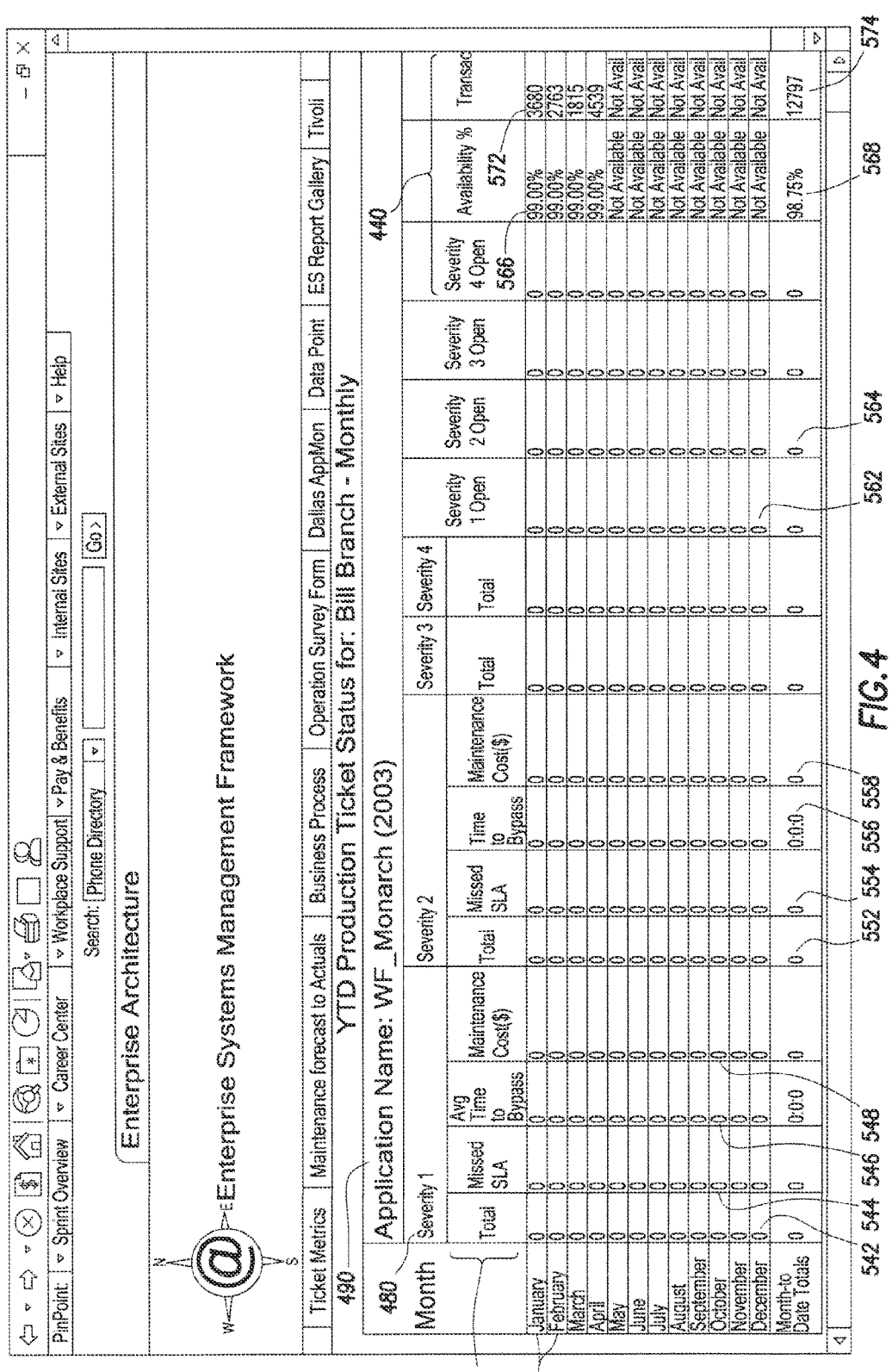
FIG. 4 shows an application-specific status overview screen of the preferred embodiments.

Referring now to FIG. 4, selecting a particular application from the prior screen displays an application-specific status overview screen 500, displayed in a web-based format. The application-specific status overview screen 500 permits a user to quickly assess the performance of the chosen application 490, sorted by month 530. The status parameters 440 are sorted by severity classifications 480, as in FIG. 3. Monthly application-specific parameter totals reported, preferably classified by severity level 480, are total opened tickets 542, tickets resulting in missed SLA's 544, average time to bypass a ticket 546, associated maintenance costs 548, and currently open tickets 562. Total availability by month 566 for the chosen application 490 is preferably expressed as a percent uptime. The number of transactions 572 for the chosen application 490 by month 530 may also be reported, as well as the total number of transactions 574 for the year to date. A transaction can be described as a particular event that is passed through an application for processing. Transactions may include different types of data routed through a particular application, with each transaction potentially having a different path to fulfillment.

These key parameters are also summed, giving a user an overall snapshot of the performance of the selected application 490 by month 530, classified by severity level 480. Month-to-date application-status parameter totals are total opened tickets 552, tickets resulting in missed SLA's 554, average time to bypass a ticket 556, maintenance costs associated with addressing tickets 558, and currently open tickets 564. Cumulative application availability 568 is calculated from the period-specific availability 566 percentages on record for the selected application 490. Selecting a month 530 may allow a user to drill down into specific application details for the month chosen.

Figure 5:
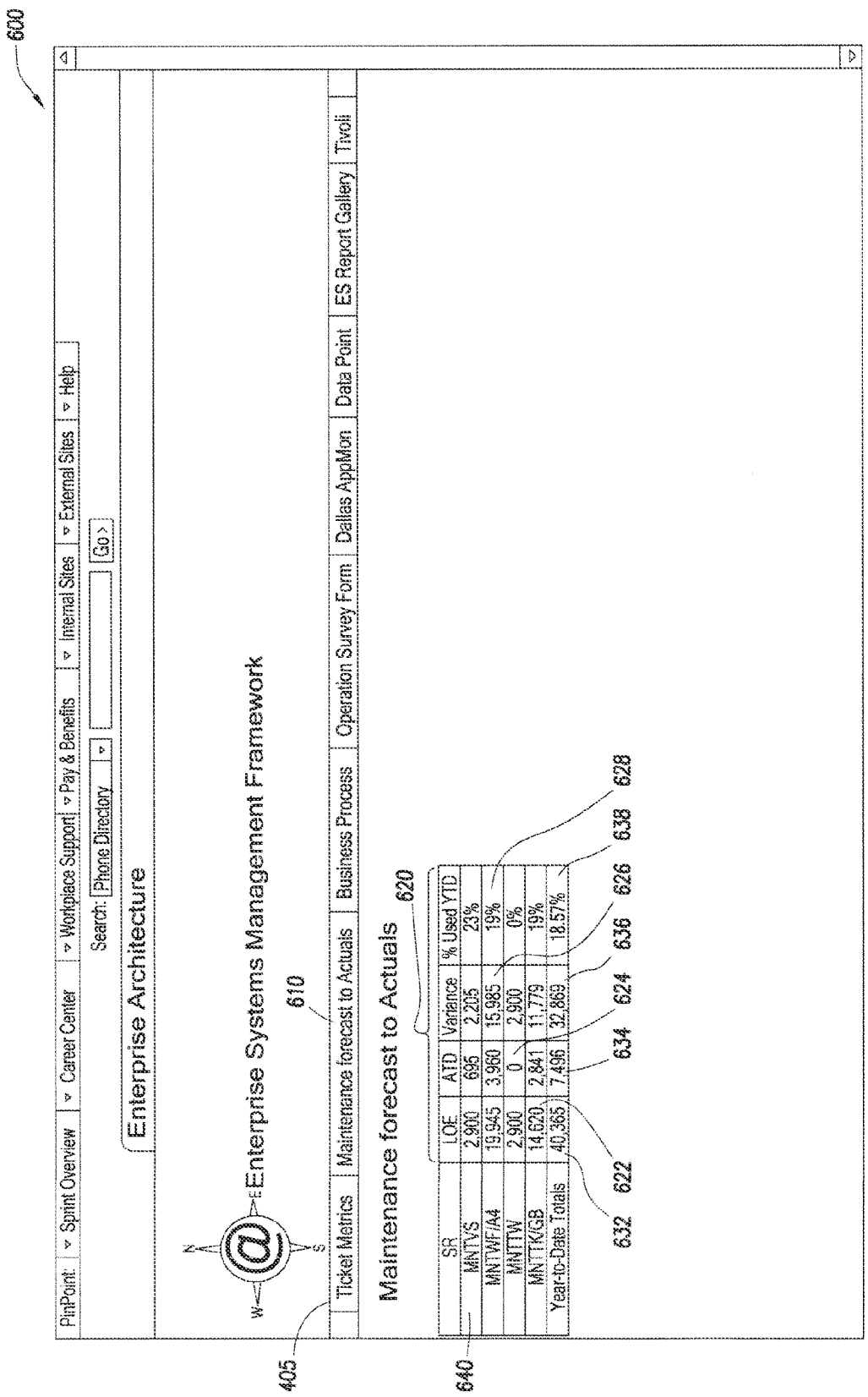
FIG. 5 shows a maintenance forecast screen of the preferred embodiments.

Referring now to FIG. 5, selecting a maintenance forecast tab 610 on menu bar 405 will display a maintenance forecast screen 600. Several forecasting parameters 620 are reported for each service request (SR) 640, which is a request for new systems or system enhancements. Forecasting parameters 620 reported include level of effort (LOE) 622, or the hours estimated and/or approved to be utilized in support of an SR; actuals to date (ATD) 624, or actual time charges worked against an SR from the start of work up to and including the present date; numerical variance 626, or LOE hours remaining to be used as per forecast for a referenced SR (e.g. LOE minus ATD); and year-to-date percent used (% Used YTD) 628, or the percentage of approved LOE hours that have been utilized thus far in support of the referenced SR.

Year-to-date forecasting parameter totals for all the listed SR's 640 are also reported as total LOE 632, total ATD 634, total variance 636 and total percent used YTD 638. Maintenance forecast screen 600 can give a user a quick snapshot of projected maintenance versus actual maintenance required, including the difference (or variance 626) between projected (LOE 622) and actual (ATD 624), as well as the percent of expected maintenance performed year-to-date (% Used YTD 628). This screen 600 is useful in quickly ascertaining whether more or less maintenance than expected is being performed, and by what amount.

Figure 6:
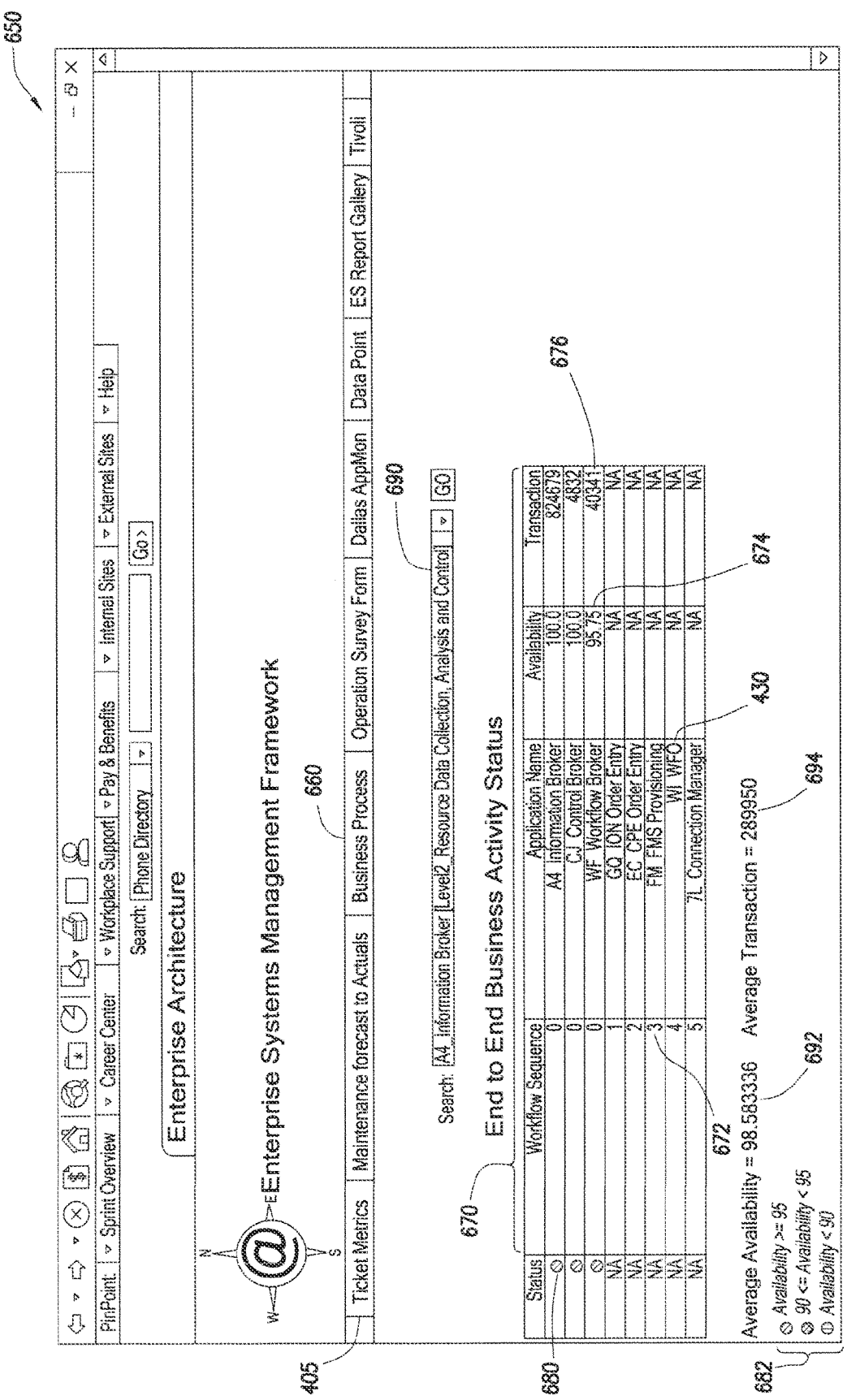
FIG. 6 shows a business-process activity status overview screen of the preferred embodiments.

Often, managers and other higher-level users are not interested in the minute details of every application, and would prefer a performance snapshot of applications within a certain business process. Referring now to FIG. 6, a business-process activity status overview screen 650 is shown when a business process tab 660 on menu bar 405 is selected. Data can be sorted by application 430 and is preferably displayed in a tabular format. Several key parameter headings 670 are displayed for each application 430, including workflow sequence number 672, application-specific availability 674, and number of application-specific transactions 676. In a default view, data for all currently monitored applications 430 is shown on screen 650. However, if applications 430 need to be filtered in order that only applications of interest are shown onscreen, they can be sorted by application filter menu 690.

A preferably color-coded status indicator 680 is listed for each application 430, and interpreted by a legend 682, allowing a user to ascertain application status with a glance. Unique status indicators 680 are generally identified by assigning a particular indicator to applications with an availability higher than a certain value, with an availability within a certain range, and with an availability below a certain value. Optionally, status indicators 680 may be unique shapes (not shown) such that they are distinct, should the screen 650 be printed in black-and-white. Average YTD availability 692 and average YTD transactions 694 are displayed numerically, so that a user can immediately determine performance across all displayed applications 430. Alternative embodiments of the business process activity screen could display or represent other variables of interest as discussed elsewhere in the present disclosure in addition to or instead of the YTD variables.

Figure 7:
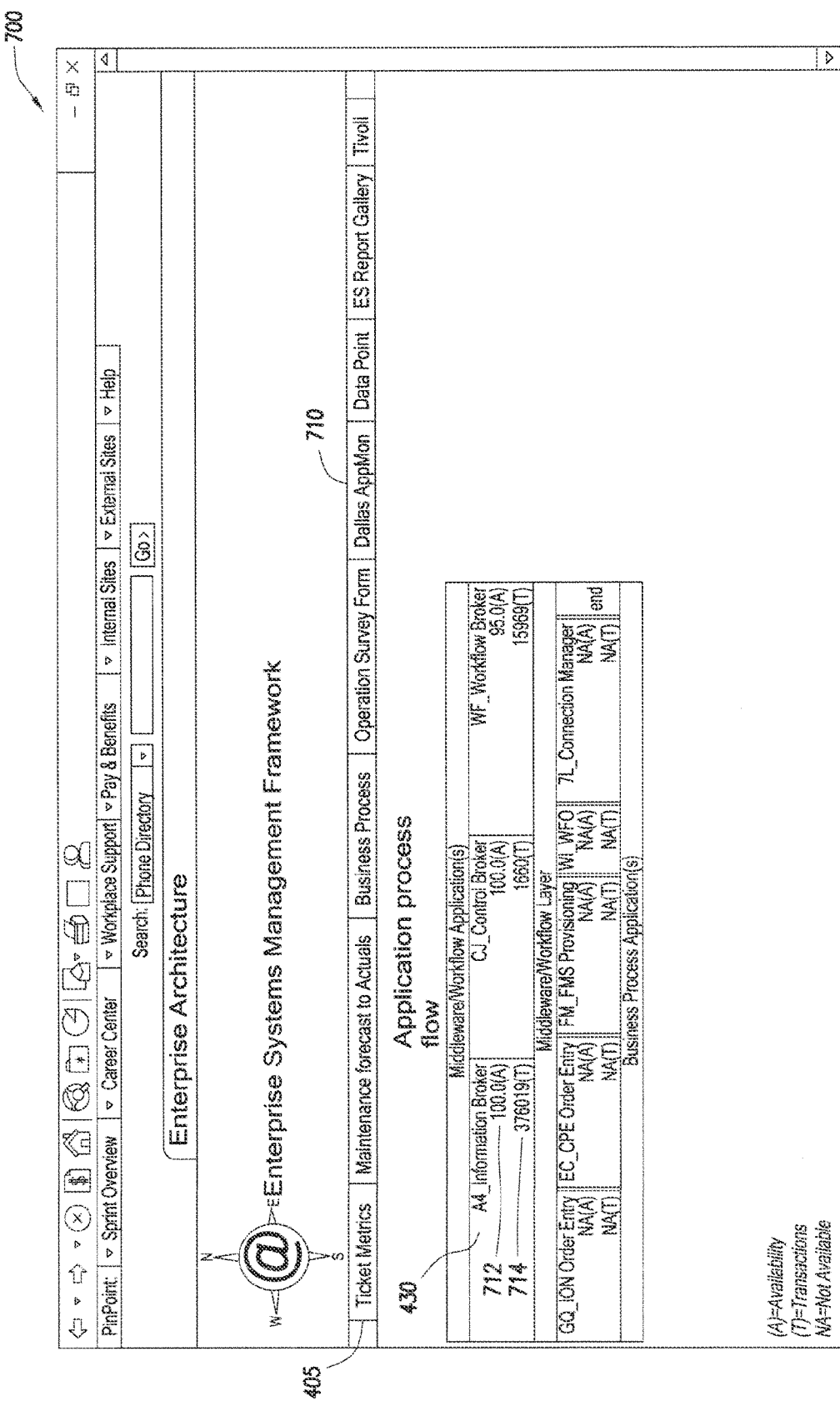
FIG. 7 shows an application process flow of the preferred embodiments.

Examination of an ordered application process flow is often desired. FIG. 7 shows an application process flow screen 700, which can be accessed by selecting an application monitor tab 710 on menu bar 405. Applications 430 with like functionality are categorized by their order within the process flow. Particular organizations tend to own applications 430 of like functionality and may wish to view all applications they support without needing to view applications outside their realm of influence. Consequently, in application flow screen 700, it can be said that applications 430 are displayed in a logical breakdown designed to complement organizational and functionality structure. Listed adjacent to each application 430 are the YTD availability 712 and YTD transactions 714. Alternative embodiments of the application flow screen 700 could display or represent other variables of interest as discussed elsewhere in the present disclosure in addition to or instead of the YTD variables.

Figure 8:
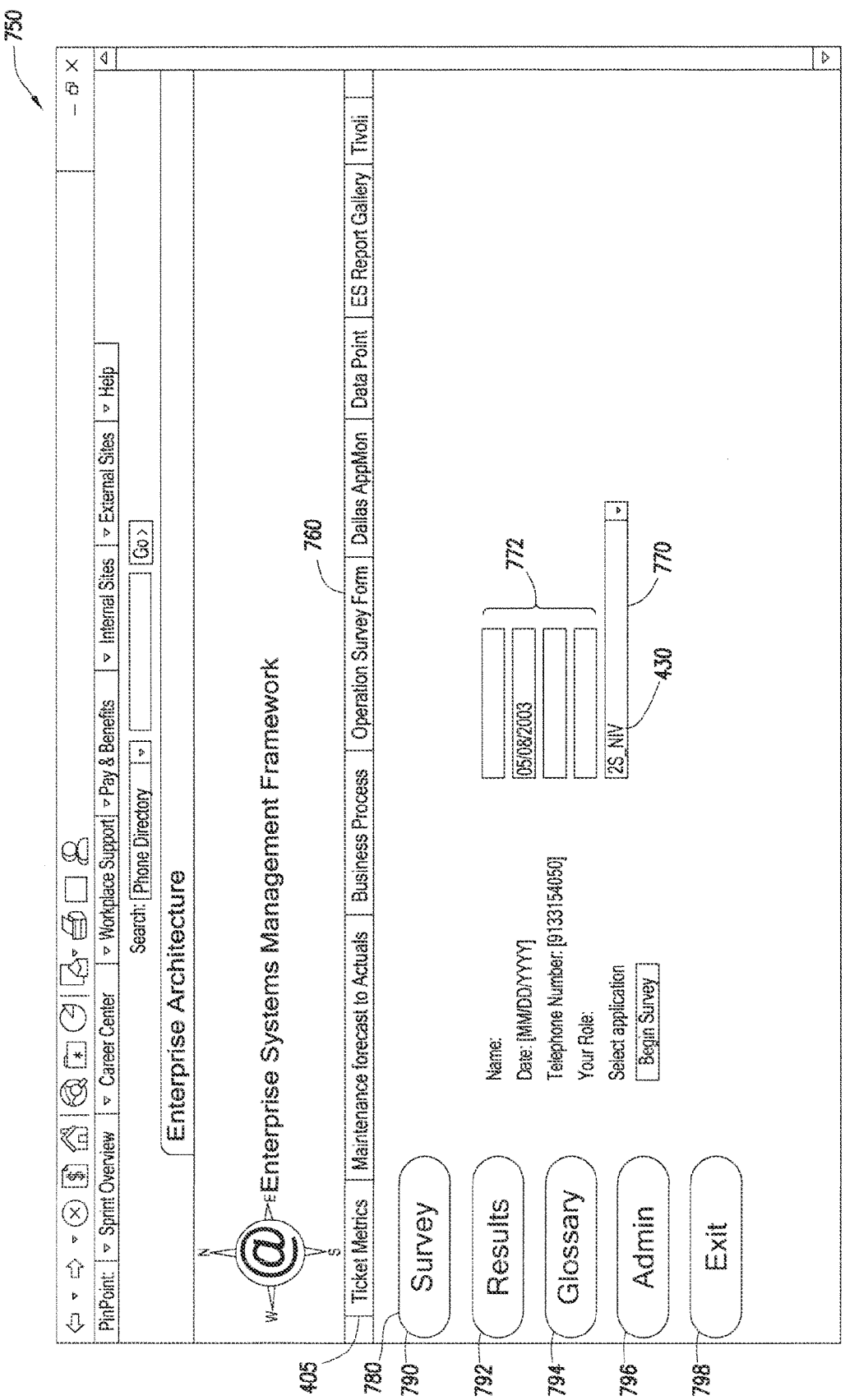
FIG. 8 shows an initial operational survey screen of the preferred embodiments.

User feedback is very important to the continuous improvement of enterprise systems. Feedback obtained allows developers to implement suggestions and correct errors, such that newer generations of the web-enabled metrics of the preferred embodiments are even more useful. Similar to the presentation of performance metrics in a consistent view, to reduce bias and misinformation in decision-making processes, user feedback collection also allows factual reporting of raw, unbiased data. Referring now to FIG. 8, initial operational survey screen 750 is displayed when a user selects an operation survey form tab 760 from menu bar 405. A user can select a particular application 430 from a menu 770 and log in using identification fields 772 to begin taking a survey on the selected application.

Figure 9:
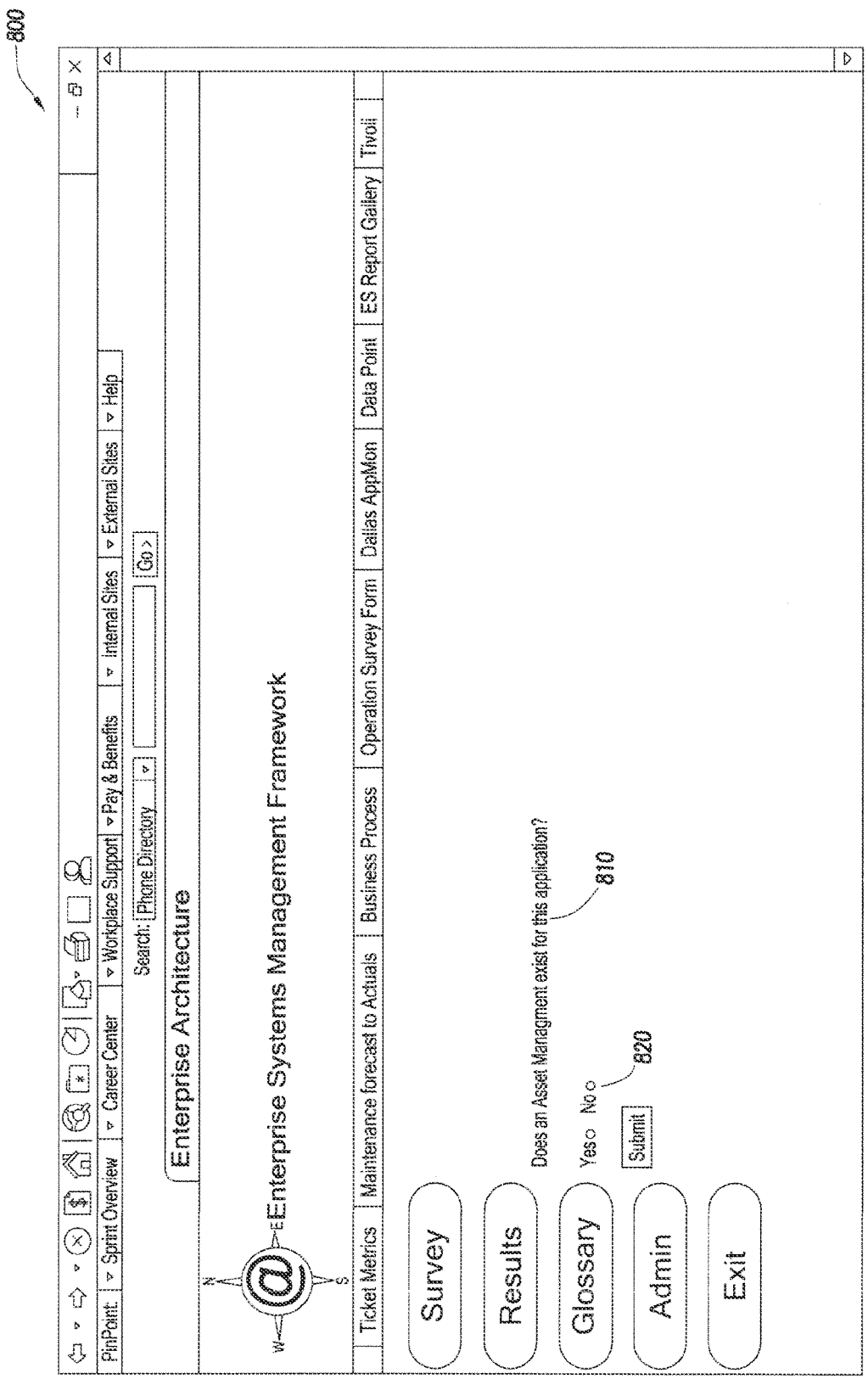
FIG. 9 shows an exemplary survey question screen of the preferred embodiments.

Navigation tabs 780 are preferably located on the left side of the screen 750, for traveling between various survey items. Navigation tabs 780 include survey tab 790 for taking a user to the survey questions, results tab 792 for viewing survey results, glossary tab 794 for reviewing associated terminology, administration tab 796 for accessing administrative functions, and exit tab 798 for exiting the survey. After logging in as directed on screen 750, a survey question screen 800 is displayed, as shown in FIG. 9. A survey question screen 800 has one or more questions 810 and an associated answer selection 820 for each question.

Figure 10:
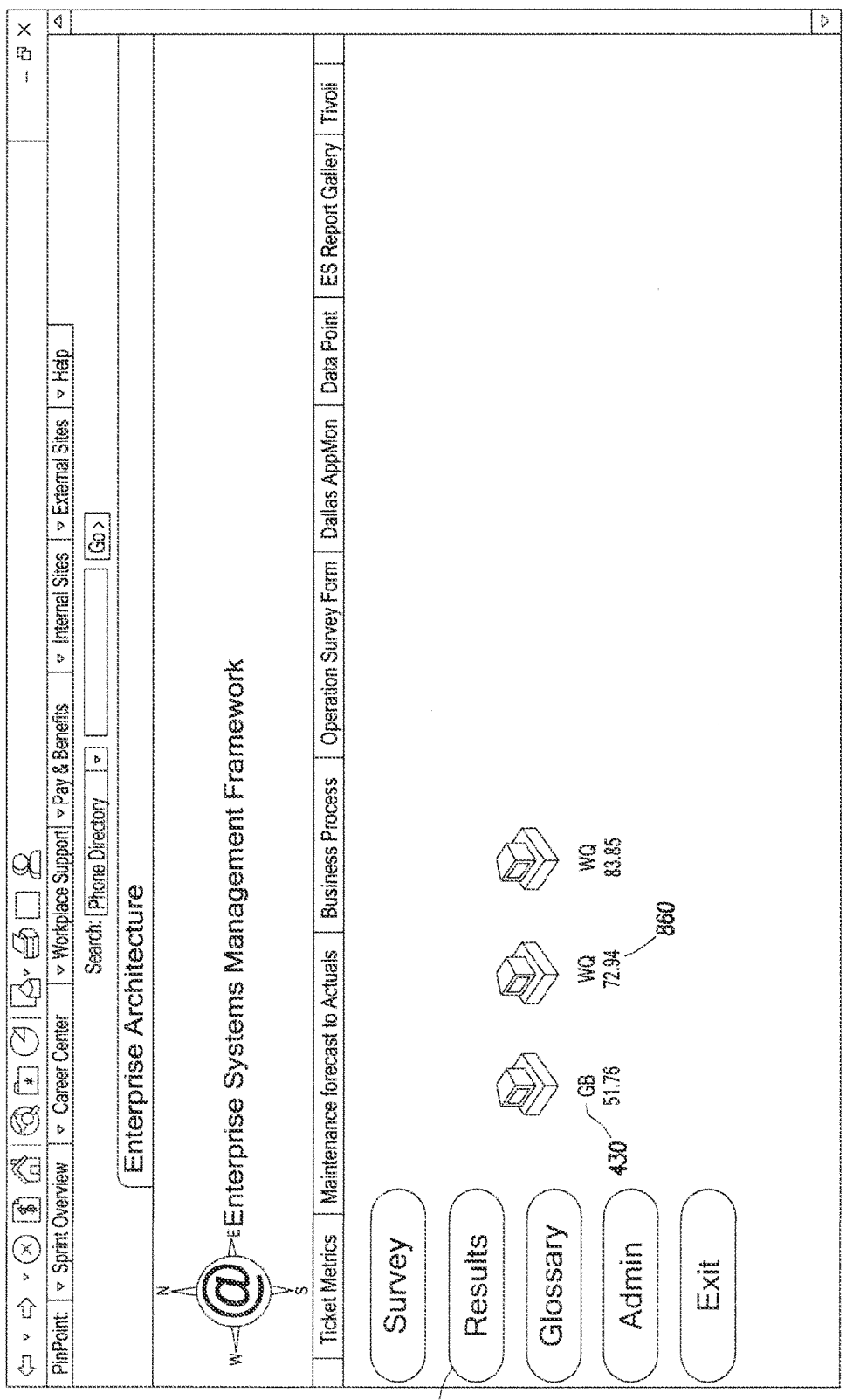
FIG. 10 shows an exemplary survey results screen of the preferred embodiments.

Completing the survey questions or selecting survey results tab 792 will display a survey results screen 850, as shown in FIG. 10. In the embodiment shown, survey results screen 850 lists one or more applications 430 and survey results values 860 associated with each application. Listed applications 430 are determined by a user when clicking on the results tab 792. As the primary benefit of the survey is to determine relative efficiency of an application when compared to other applications within the suite, the application results displayed are customizable, such that a user can determine which applications are listed. All applications 430 for which the survey has been completed are listed as selectable choices on the survey results screen 850. Different numerical weights are assigned to each user response within the survey. These numbers are then measured against a scale established by user inputs for all applications 430 for which the survey has been completed, in order to assign a rating. The survey is completely relative, based upon user input, and measures currently supported applications 430 against one another to identify applications that may be candidates for either increased development or process improvement focus.

Figure 11:
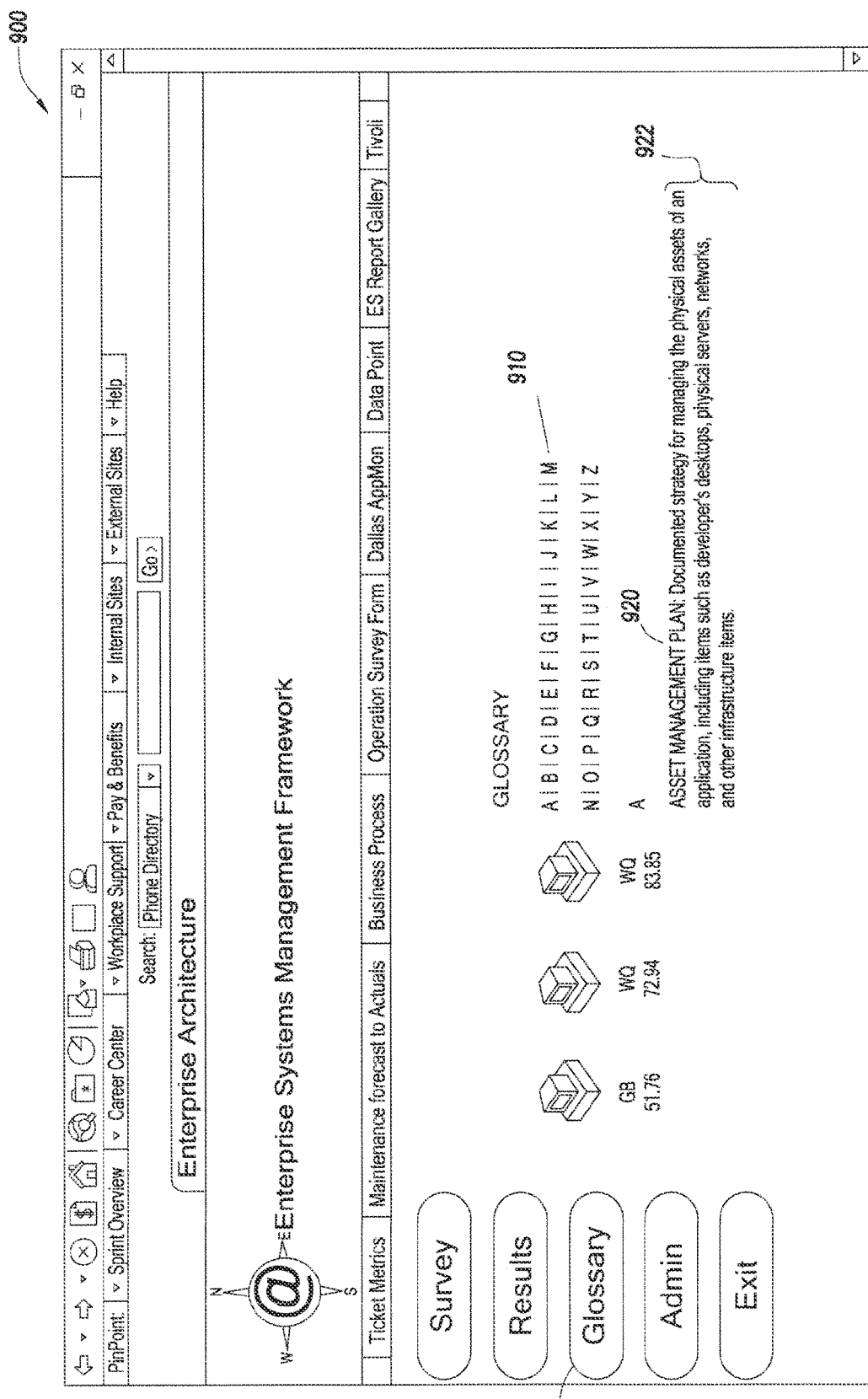
FIG. 11 shows a glossary screen of the preferred embodiments.

Referring now to FIG. 11, a glossary screen 900 is shown, which can be accessed by selecting glossary tab 794. Glossary screen 900 displays an alphabetized hyperlinked index 910 as well as terms 920 and associated definitions 922. Providing the glossary can help promote understanding of the arcane and sometimes ambiguous terminology associated with enterprise management, such that data reported by the web-enabled metrics is more clearly understood.

The status screens disclosed in FIGS. 3-11 have been shown in a web-based format. Users within companies utilize a wide variety of computing systems on a daily basis. Desktop computers, laptop computers and other portable electronics may use various operating systems and/or platforms. A web-enabled metrics presentation in accordance with the preferred embodiments allows users on different platforms and/or different operating systems to view the same information in a consistent format. Preferably, the web-based user interface shown in FIGS. 3-11 is accessible on an enterprise intranet. Further, gathering, packaging and presenting data for the various metrics across all applications and systems within the business process allows any user to have the same view and assessment of the data reported. Since the web-enabled metrics of the preferred embodiments are preferably presented on a network, the information is generally available to users throughout the enterprise. Optionally, access may be restricted, such that only certain users are permitted to access more sensitive data.

Numerous variations and modifications will become apparent to those skilled in the art once the above disclosure is fully appreciated.

What is claimed is:

1. A method for monitoring enterprise system performance, the method comprising:
   receiving performance metric data from trouble tickets associated with a plurality of applications in different enterprise systems;
   storing the performance metric data in a database;
   providing the performance metric data to a web-based browser interface; and
   displaying one or more filtered views of the performance metric data as one or more linked web pages, wherein the one or more filtered views includes at least one of an application status overview filtered view, an application-specific status overview, and a business-process activity status overview filtered view;

wherein the one or more linked web pages include the business-process activity status overview filtered view having availability displayed as a function of application, and wherein the applications are displayed in a business process order.

2. The method of claim 1, wherein the performance metric data for each of the trouble tickets includes an associated application, date, and severity level.

3. The method of claim 2, wherein the performance metric data further includes data indicative of application availability.

4. The method of claim 3, wherein the performance metric data further includes completed transaction counts.

5. The method of claim 2, wherein the one or more linked web pages include the application status overview filtered view, the application status overview filtered view displaying the performance metric data from the plurality of applications, the performance metric data includes trouble ticket counts displayed as a function of each of the plurality of applications and severity.

6. The method of claim 5, wherein the application status overview filtered view further includes a maintenance cost associated with high-severity trouble ticket counts.

7. The method of claim 5, wherein the application status overview filtered view further includes application availability.

8. The method of claim 5, wherein the application status overview filtered view displays for each of the plurality of applications trouble ticket counts for trouble tickets having an associated date within a specified date range.

9. The method of claim 2, wherein the one or more linked web pages include the application-specific status overview filtered view, the application-specific status overview filtered view displaying the performance metric data from a specific application, the performance metric data includes trouble ticket counts displayed as a function of time and severity.

10. The method of claim 9, wherein the application-specific status overview filtered view further includes a maintenance cost associated with high-severity trouble ticket counts.

11. The method of claim 1, wherein the one or more linked web pages include the application-specific status overview filtered view having availability of a given application displayed as a function of time.

12. The method of claim 1, wherein the business-process activity status overview filtered view further includes transaction counts as a function of application.

13. The method of claim 1, further comprising: receiving survey responses from application managers; providing the survey response data to said web-based browser interface; and displaying the survey response data as a survey results web page.

14. A system that monitors enterprise system performance, the system comprising:
    at least one user interface configured to display a web-based browser interface;
    a datastore linked to the user interface; and
    a plurality of enterprise systems, wherein the datastore is configured to report performance metric data from trouble tickets associated with a plurality of applications in the enterprise systems to the user interface, wherein the user interface displays one or more filtered views of the performance metric data as one or more linked web pages, wherein the one or more filtered views of the performance metric data includes at least one of an application status overview filtered view, an application-specific status overview filtered view, and a business-process activity status filtered view;

wherein the one or more linked web pages include the business-process activity status overview filtered view having availability displayed as a function of application, and wherein the applications are displayed in a business process order.

15. The system of claim 14, wherein the performance metric data for each of the trouble tickets includes an associated application, date, and severity level.

16. The system of claim 15, wherein the performance metric data further includes data indicative of application availability.

17. The system of claim 16, wherein the performance metric data further includes completed transaction counts.

18. The system of claim 15, wherein the one or more linked web pages include the application status overview filtered view, the application status overview filtered view displays the performance metric data from a plurality of applications, the performance metric data includes trouble ticket counts displayed as a function of each of the plurality of applications and severity.

19. The system of claim 18, wherein the application status overview filtered view further includes a maintenance cost associated with high-severity trouble ticket counts.

20. The system of claim 18, wherein the application status overview filtered view further includes application availability.

21. The system of claim 18, wherein the application status overview filtered view displays for each of the plurality of applications trouble ticket counts for trouble tickets having an associated date within a specified date range.

22. The system of claim 15, wherein the one or more linked web pages include the application-specific status overview filtered view, the application-specific status overview filtered view displays performance metric data from a specific application, the performance metric data includes trouble ticket counts displayed as a function of time and severity.

23. The system of claim 22, wherein the application-specific status overview filtered view further includes a maintenance cost associated with high-severity trouble ticket counts.

24. The system of 14, wherein the one or more linked web pages include the application-specific status overview filtered view having availability of a given application displayed as a function of time.

25. The system of claim 14, wherein the business-process activity status overview filtered view further includes transaction counts as a function of application.

26. The system of claim 14, wherein the web-based browser interface is further configured to: receive survey responses from application managers; provide survey response data to said web-based browser interface; and display the survey results data as a survey results web page.

* * * * *